United States Patent [19]
Arimoto et al.

[11] Patent Number: 5,438,388
[45] Date of Patent: Aug. 1, 1995

[54] PHOTOGRAPHIC PROCESSING APPARATUS

[75] Inventors: Keigo Arimoto; Tohru Tanibata, both of Wakayama, Japan

[73] Assignee: Noritsu Koki Co., Ltd., Wakayama, Japan

[21] Appl. No.: 249,977

[22] Filed: May 27, 1994

[30] Foreign Application Priority Data

Jun. 7, 1993 [JP] Japan ................... 5-136077

[51] Int. Cl.⁶ ................... G03B 29/00; G03B 27/58
[52] U.S. Cl. ................................... 355/28; 355/72
[58] Field of Search ................... 355/50, 72, 27–29

[56] References Cited

U.S. PATENT DOCUMENTS

3,580,674  5/1971  Schunck ................... 355/28
3,674,367  7/1972  Chapman ................... 355/77

*Primary Examiner*—Richard A. Wintercorn
*Attorney, Agent, or Firm*—Wenderoth, Lind & Ponack

[57] ABSTRACT

A photographic processing apparatus includes a first magazine for feeding a first sensitive material to a development station, a second magazine for feeding a second sensitive material in a direction at an right angle to the feeding direction of the first sensitive material, a first cutter for separating a first sensitive sheet from the first sensitive material, a second cutter for separating a second sensitive sheet from the second sensitive material. A conveying pass line conveys the first and second sensitive sheets separated by their respective first and second cutters to the development station. A transfer shifting device mounted at the intersection of the feeding direction of the first sensitive material and the feeding direction of the second sensitive material for transfers the second sensitive sheet to the pass line.

3 Claims, 7 Drawing Sheets

PHOTOGRAPHIC PROCESSING APPARATUS

BACKGROUND OF THE INVENTION

The present invention relates to an improved photographic processing apparatus for carrying out a sheet processing method in which a roll of sensitive paper is cut into desired sizes and then exposed to light.

Figure 6:
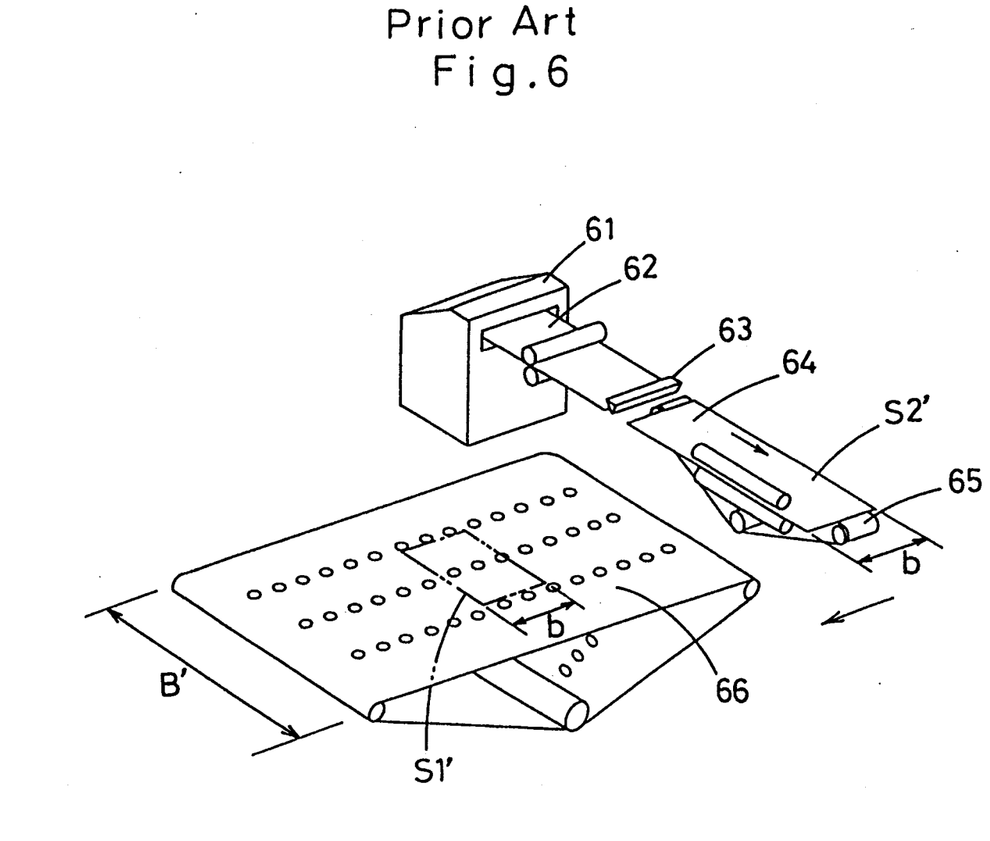
FIG. 6 is a perspective view of a conventional photographic processing apparatus.

In a conventional photographic processing apparatus shown on FIG. 6, a roll of sensitive sheet material 62 fed out from a magazine 61 is cut by a cutter 63 to a size 64 and the sensitive paper sheet of the size 64 is shifted by a shifting means 65 to run in a (widthwise) direction at a right angle to the feeding direction before being exposed at an exposure stage 66 and delivered further to a development station (not shown).

Figure 7:
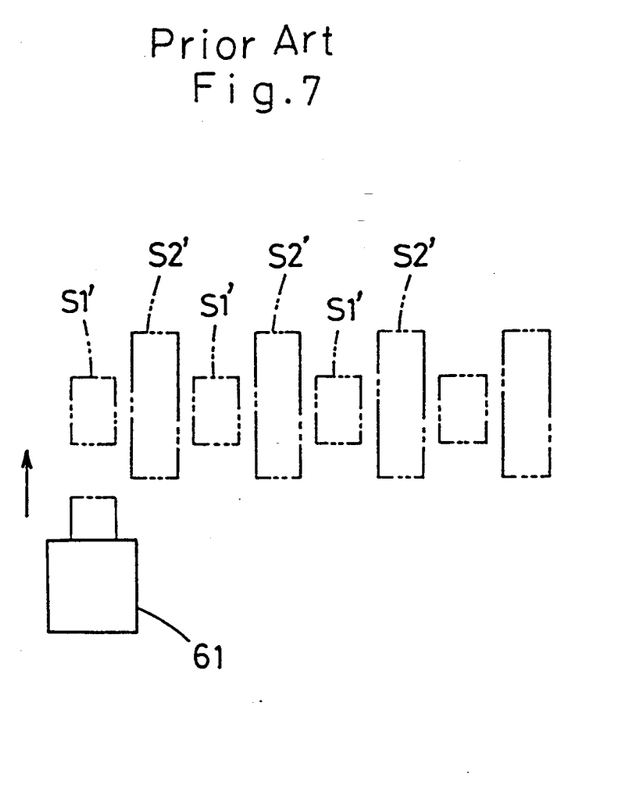
FIG. 7 is a plan view explaining the transfer of different size sensitive paper sheets in the conventional photographic processing apparatus.

This arrangement allows two different size sensitive paper sheets S1' and S2' to be printed repeatedly (as shown in FIG. 7) from a negative film containing a random order of standard size frames (24×36 mm of 135 format) and panoramic size frames (13×36 mm of 135 format).

The disadvantage of the foregoing arrangement however is that the sensitive paper sheets S1' and S2' of which width b is perpendicular to the width B' of the exposing stage 66 are not increased in the print size utilizing the maximum exposure area of the exposing stage 66. It is an object of the present invention, in view of overcoming the above disadvantage, to provide a photographic processing apparatus in which larger size are produced relating to the maximum exposure area of an exposing stage while different size prints are successfully processed without lowering operating efficiency.

SUMMARY OF THE INVENTION

A defined in claim 1 of this application, a photographic processing apparatus according to the present invention separates a desired size sheet from a sensitive material roll by cutting with a cutter, exposing it to light on an exposing stage at an exposure station, and transfers it to a development station. A first magazine feeds a first sensitive material to the development station, a second magazine feeds a second sensitive material in a direction at an right angle to the feeding direction of the first sensitive material, a first cutter separates a first sensitive sheet from the first sensitive material, and a second cutter separates a second sensitive sheet from the second sensitive material. A transfer pass line conveys the first or second sensitive sheets separated by the respective first and second cutters to the development station. The exposing stage is disposed across the pass line. A transfer shifting device is mounted at the intersection of the feeding direction of the first sensitive material and the feeding direction of the second sensitive material for transferring the second sensitive sheet to the pass line. In operation, while the first sensitive sheet separated by the first cutter is directly conveyed along the pass line, the second sensitive sheet separated by the second cutter is transferred to the pass line by the transfer shifting device to shift its conveying direction to the direction of the pass line which is at a right angle to the feeding direction of the second sensitive sheet and thus is conveyed widthwisely thereof.

The exposure station can be located downstream of the intersection of the pass line where the second sensitive sheet is loaded to allow the shifting of the conveying direction of the second sensitive sheet by the transfer shifting device to be executed before exposure action at the exposure station.

The apparatus according to claim 1 can be characterized in that the exposure station is located at the intersection to allow the shifting of the conveying direction of the second sensitive sheet by the transfer shifting means to be executed after exposure action at the exposure station.

In operation of the photographic processing apparatus of the present invention, the first sensitive material roll is fed out from the first magazine towards the development station and is cut by the first cutter into a desired size.

The desired size of the first sensitive sheet is then conveyed in the same direction as the feeding direction from the first magazine (at a right angle to the width of the first sensitive sheet) to the exposing stage.

The length of the sensitive sheet advanced in the conveying direction corresponds to the lengthwise distance of the exposing stage and the widthwise distance of the exposing stage is at a right angle to the conveying direction. As the result, the width of the first sensitive sheet fed to the exposing stage rests in the widthwise direction of the exposing stage.

This allows a large print size to be exposed using the maximum of the effective exposing area of the exposing stage. In other words, the first sensitive sheet which is equal in width to the effective exposing area of the exposing stage can be fed from the first magazine to the exposing stage for exposure to make a print of the sizes of the full exposing area.

The second sensitive sheet fed out from the second magazine and separated by the second cutter is transferred to the pass line by the transfer shifting device and then, is conveyed with its widthwise direction in its conveying direction, which has been shifted to the pass line direction at a right angle to the feeding direction of the second magazine. Accordingly, the processing of a different print size can be performed with optimum efficiency.

DETAILED DESCRIPTION OF THE PREFERRED EMBODIMENTS

Embodiment 1

Figure 1:
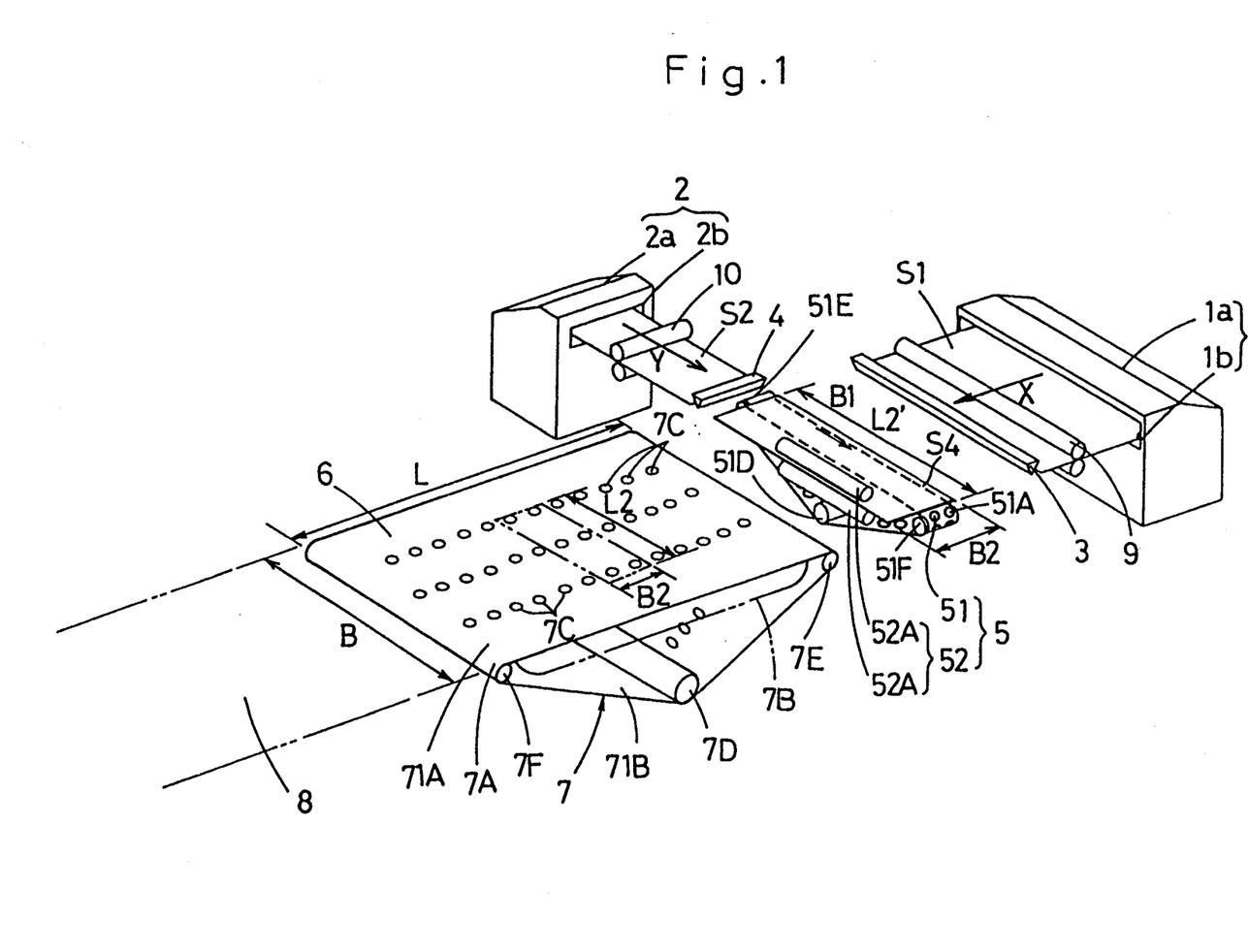
FIG. 1 is a perspective view of a photographic processing apparatus showing a first embodiment of the present invention.

A first embodiment of the present invention will be described referring to FIGS. 1 and 2.

A photographic processing apparatus of the first embodiment comprises an exposure station including a first magazine 1, a second magazine 2, a first cutter 3, a second cutter 4, a transfer shifting means 5, an exposing stage 6, an exposing light source (not shown), an exposing stage suction conveying means 7, a conveying pass line 8, and a development station (not shown).

The first magazine 1 has a feeding outlet 1b provided in the front of a magazine body 1a thereof. The first magazine 1 contains therein a roll of a first sensitive material S1 which has a large width for making a large size print and is supplied from the first magazine 1 with a leading end passing through the feeding outlet 1b.

A set of first feeding rollers 9 are disposed across the feeding direction (referred to as the X direction hereinafter) of the first sensitive material S1 is from the first magazine 1. As the first feeding rollers 9 rotate, the leading end of the first sensitive material S1 gripped between them is advanced through the feeding outlet 1b of the first magazine 1.

The first cutter 3 cuts the first sensitive material S1 supplied from the first magazine 1 into a predetermined print size S3 on which a corresponding enlargement of a frame of a negative film is printed.

The first magazine 1 is located so that when the first sensitive material sheet of the print size S3 is advanced in the X direction to the exposing stage 6, its measurement denoted by B1 matches the effective area of the exposing stage 6.

Similarly, the second magazine 2 has a feeding outlet 2b provided in the front of a magazine body 2a thereof. The second magazine 2 accommodates therein a roll of a second sensitive material S2 which has a given width for making a standard or panoramic print and is supplied from the second magazine 2 with its leading end passing through the feeding outlet 2b.

A set of second feeding rollers 10 are disposed across the feeding direction (referred to as the Y direction hereinafter) of the second sensitive material S2 from the second magazine 2. As the second feeding rollers 10 rotate, the leading end of the second sensitive material S2 gripped between them and material S2 is advanced through the feeding outlet 2b of the second magazine 2.

The second cutter 4 cuts the second sensitive material S2 supplied from the second magazine 2 into either a predetermined standard or panoramic print size S4 on which a corresponding standard or panoramic frame of a negative film is printed.

The standard print size is generally an E-type print ($82 \times 120$ mm) or an L-type print ($89 \times 127$ mm) and the panoramic size has dimensions of $89 \times 254$ mm.

The transfer shifting means 5 comprises a suction conveying means 51 and a pressure conveying means 52 mounted to one side of the suction conveying means 51.

The suction conveying means 51 has a suction chamber 51B (denoted by the two-dot chain line in FIG. 2) provided on the back of a suction belt 51A thereof. In action, either of the first and second sensitive sheets S3, S4 separated by the first and second cutters 3,4 respectively is secured by suction to the suction belt 51A.

More specifically, the suction belt 51A has a multiplicity of apertures 51C provided in the entire surface thereof and is mounted between three rollers 51D, 51E, and 51F in a triangle configuration. The suction chamber 51B is provided with a built-in suction fan (not shown) and has an air intaking inlet (not shown) in a upper part thereof and an air discharging outlet (not shown) in a lower part thereof.

The suction chamber 51B is disposed inwardly of the suction belt 51A so that its air intaking inlet is located opposite to the back of a horizontal belt run on region 51G of the suction belt 51A.

When the suction fan rotates, the air in the suction chamber 51B is removed through the air discharging outlet causing the air intaking inlet and thus, the apertures 51C to draw the first or second sensitive sheet S3 towards the suction belt 51A. As the suction belt 51A runs, the first or second sensitive sheet S3, is conveyed along the horizontal region 51G. When the suction belt 51A comes to the end of the horizontal region 51G or the beginning of a sloped run or region 51H and moves away from the air intaking inlet of the suction chamber 51B, the first or second sensitive sheet S3,S4 is released from the suction belt 51A.

The pressure conveying means 52 comprises a pair of pressure rollers 52A which are spaced from each other when the sensitive sheet S is allowed to pass through the space.

The pressure conveying means 52 is adapted to cooperate with the suction conveying means 51 and is disposed on one side of the horizontal region 51G of the suction belt 51A.

The transfer shifting means 5 is located at the intersection section of the X and Y directions where as the suction conveying means 51 is turned 90 degrees about its center by the action of a turning means (not shown), the conveying direction of the suction belt 51A shifts from the X direction to the Y direction or vice versa.

Figure 2:
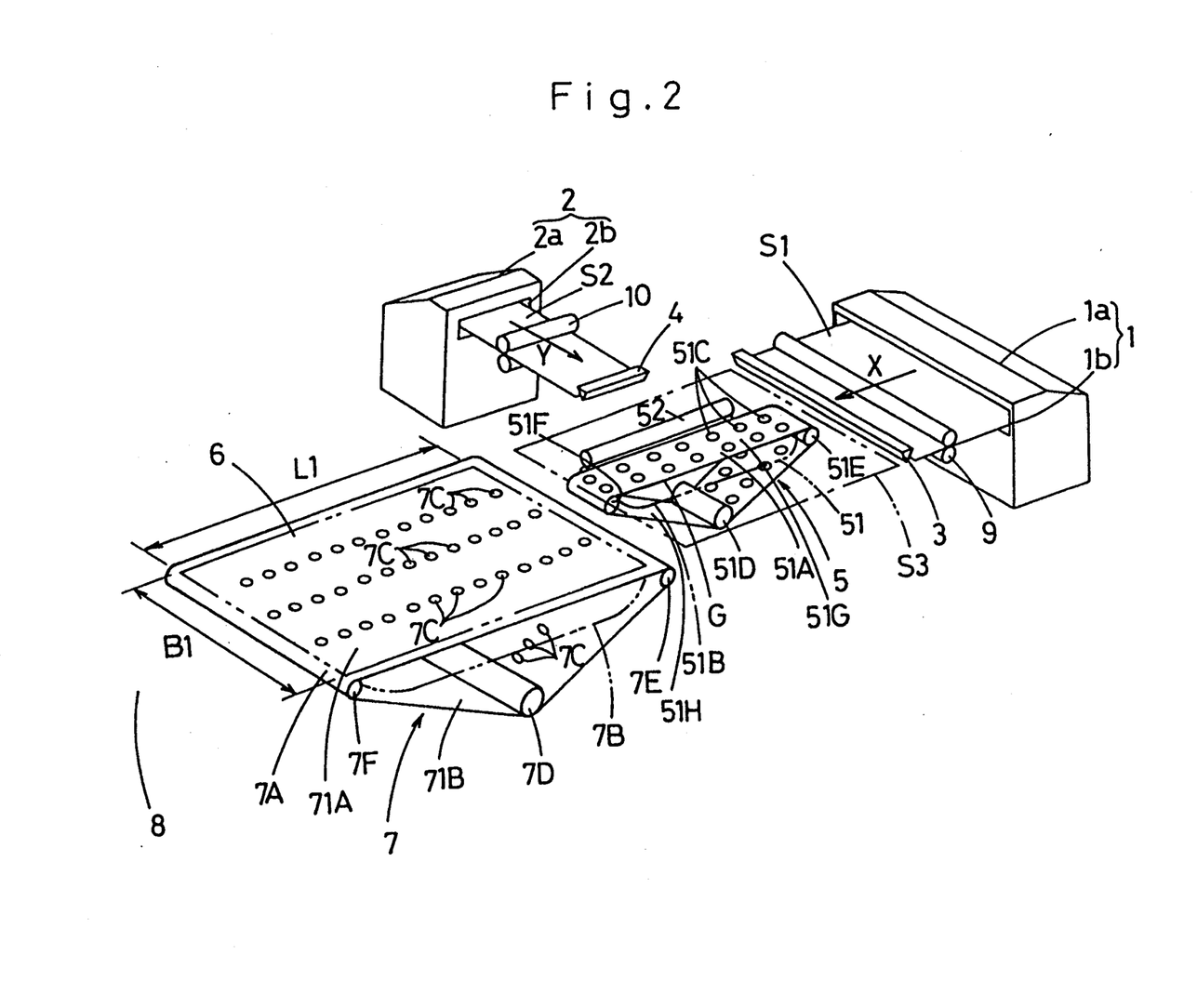
FIG. 2 is a further perspective view of the photographic processing apparatus of the first embodiment.

Accordingly, when the suction conveying means 51 is directed in the Y direction, the second sensitive sheet S4 is advanced to the intersection (FIG. 1) and when it is directed in the X direction, the first sensitive sheet S3 is moved to the intersection (FIG. 2).

The exposing stage suction conveying means 7 is provided to feed and hold the first or second sensitive sheet S3,S4 at the exposing location in the exposing stage 6 and after exposure to light, to transfer it further to the development station and thus is disposed on the downstream side of the intersection in the X direction.

The exposing stage conveying means 7, similar to the suction conveying mean 51 in the transfer shifting means 5, comprises a suction chamber 7B provided with a built-in suction fan (not shown) and mounted in the back of an exposing stage suction belt 7A for holding the first or second sensitive sheet S3,S4 by suction to the exposing stage suction belt 7A.

The exposing stage suction belt 7A has a multiplicity of apertures 7C provided in the entire surface thereof and is mounted between three rollers 7D, 7E, and 7F in a triangle configuration. When the suction fan rotates, the air in the suction chamber 7B is removed through an air discharging outlet causing an air intaking inlet of the suction chamber 7B and thus the apertures 7C of the suction belt 7A to draw the first S3 or second sensitive sheet S3,S4 which are then conveyed with the suction belt 7A. As the exposing stage suction belt 7A runs from a horizontal region 71A to a tilted or inclined run on region 71B, it goes away from the air intaking inlet of the suction chamber 7B. As a result, the first or second sensitive sheet S4 is unloaded from the exposing stage suction belt 7A traveling towards the region 71B.

The exposing stage suction conveying means 7 acts as a part of the transfer pass line 8.

The exposing stage 6 is disposed above the horizontal region 71A of the exposing stage suction belt 7A of the exposing stage suction conveying means 7 for exposing the first or second sensitive sheet S3,S4 to light.

The processing of a negative film carrying a random order of standard size frames and panoramic size frames will now be explained referring to FIG. 1.

1. The transfer shifting means 5 is first actuated to turn the suction conveying means 51 for conveying the second sensitive material S2 in the Y direction.
2. The leading end of the second sensitive material roll S2 is fed from the second magazine 2 to the transfer shifting means 5 by the action of the second feeding rollers 10.
3. The leading end of the second sensitive material roll S2 fed to the transfer shifting means 5 is securely held by suction and is advanced to a predetermined length on the suction belt 51A of the suction conveying means 51 of the transfer shifting means 5.

At the time, the pressure rollers 52A of the pressure conveying means 52 are spaced from each other to pass the leading end of the second sensitive material roll S2.

4. The predetermined length of the second sensitive material roll S2 is then cut by the second cutter 4 to a standard L2 or panoramic size L2' as desired.
5. The standard L2 or panoramic size sheet L2' which is now the second sensitive sheet S4 is positioned in the lengthwise direction by the control action of the suction belt 51A to match the effective exposing area of the exposing stage 6, before being conveyed to the exposing stage 6.
6. After the suction of the suction belt 51A is turned off, the second Sensitized sheet S4 is held and transferred by the pressure conveying means 52 to the exposing stage suction conveying means 7.
7. The second sensitive sheet S4 fed to the exposing stage suction conveying means 7 is positioned in the widthwise direction of B2 by the control action of the exposing stage suction belt 7A to be positioned in the effective exposing area of the exposing stage 6.
8. When the secondsensitive sheet S4 has correctly been positioned in both the lengthwise (L2 or L2') and widthwise (B2) directions and remains held in the effective exposing area of the exposing stage 6, it is exposed to light.
9. The second sensitive sheet S4, after being exposed, is conveyed by the exposing stage suction belt 7A in the X direction towards the development station.

As explained, the transfer of the second Sensitive sheet S4 of a standard or panoramic size to be exposed to make a print from a negative film is shifted by the transfer shifting means 5 from the Y direction to the X direction so that the second sensitive sheet S4 can be conveyed to the exposing stage 6 by moving in the widthwise direction (due to the width B2 extending in the X direction). Accordingly, the overall procedure of print development will be performed with optimum efficiency.

The processing of a large size sheet using the maximum of the exposing area of the exposing stage 6 will be explained referring to FIG. 2.

1. The transfer shifting means 5 is first actuated to turn the suction conveying means 51 for conveying the first sensitive material S1 in the X direction.
2. The leading end of the first sensitive material roll S1 is fed from the first magazine 1 to the transfer shifting means 5 by the action of the first feeding rollers 9.
3. The leading end of the first sensitive material roll S1 fed to the transfer shifting means 5 is securely held by suction and is advanced to a predetermined length on the suction belt 51A of the suction conveying means 51 of the transfer shifting means 5.

At such time, the pressure rollers 52A of the pressure conveying means 52 are spaced from each other to pass the leading end of the first sensitive material roll S1.

4. The predetermined length of the first sensitive material roll S1 is then cut by the first cutter 3 to a given size L1 of the large print.
5. The large print size L1 which is now the first sensitive sheet S3 is held and transferred by the suction belt 51A to the exposing stage suction belt 7A of the exposing stage suction conveying means 7.
6. The first sensitive sheet S3 fed to the exposing stage suction conveying means 7 is positioned in the L1 or lengthwise direction by the control action of the exposing stage suction belt 7A to be positione in the effective exposing area of the exposing stage 6.

As is understood, the first magazine 1 is located so that the width B1 of the first sensitive sheet S3 matches the effective exposing area of the exposing stage 6. Therefore, the positioning of the first sensitive sheet S3 in the B1 or widthwise direction at the exposing stage 6 is not needed.

Also, if the first sensitive sheet S3 is transferred to the exposing stage conveying means 7 by the action of the pressure conveying means 52, the transfer shifting means 5 needs not be turned.

7. When the first sensitive sheet S3 has correctly been positioned in the effective exposing area of the exposing stage 6, it is exposed to light.
8. The first sensitive sheet S3 after being exposed is conveyed by the exposing stage suction belt 7A towards the development station.

As explained, the width B1 of the first sensitive sheet S3 coincides with the width B of the exposing stage 6 whereby the effective exposing area will fully be utilized to make a large size print.

Embodiment 2

Figure 3:
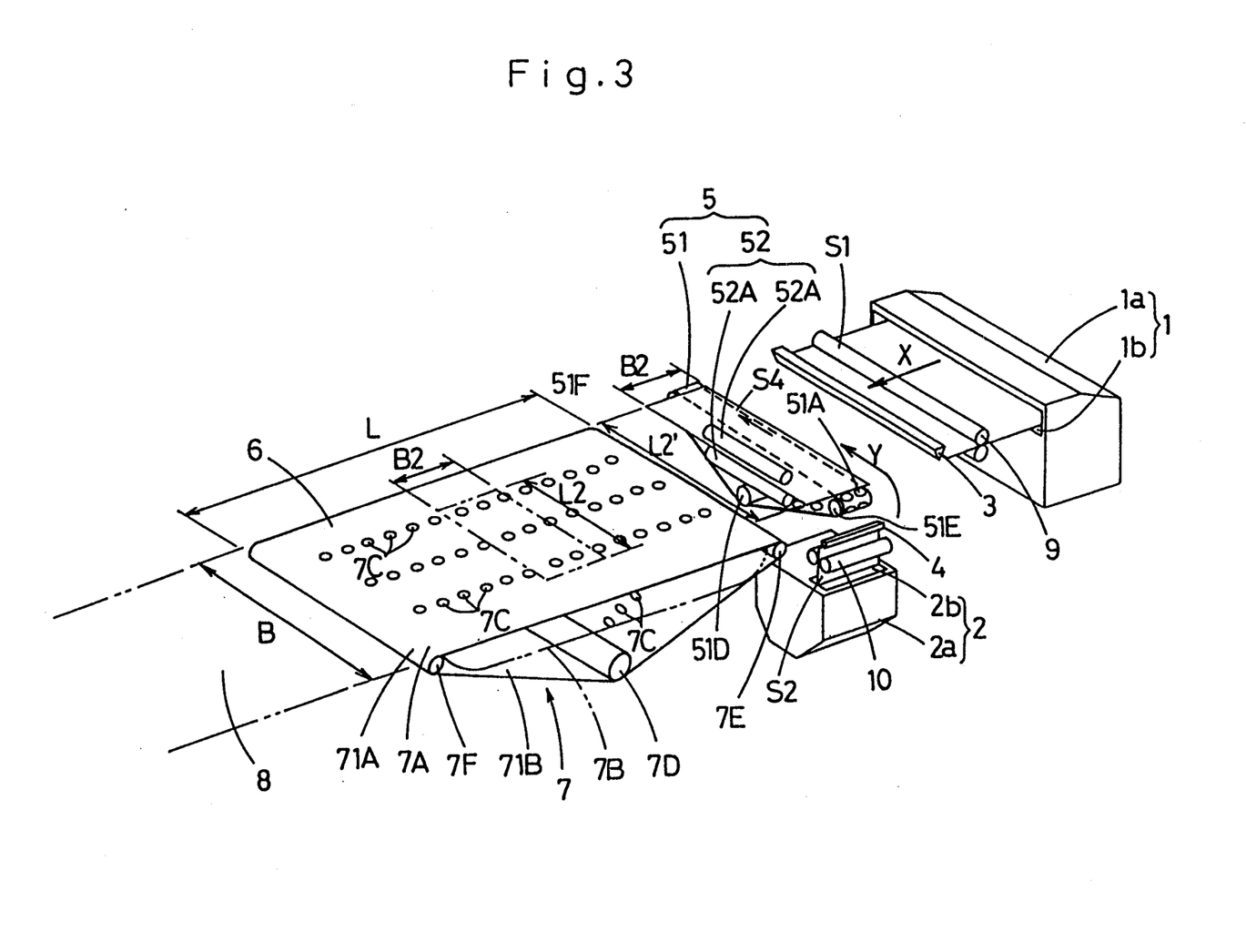
FIG. 3 is a perspective view of a photographic processing apparatus showing a second embodiment of the present invention.

A second embodiment of the present invention will now be described referring to FIG. 3.

A second magazine 2 is disposed beneath the X direction pass line of a sensitive material sheet. A second cutter 4 and second feeding rollers 10 are mounted at one side of the X direction pass line between the second magazine 2 and a suction conveying means 51 of a transfer shifting means 5.

Other components are identical in the construction and arrangement to those of the first embodiment as denoted by the same numerals and will not be explained in no more details.

The processing of the sensitive sheet to make a print from a negative film carrying a random order of standard size frames and panoramic size frames will now be explained.

1. The transfer shifting means 5 is first actuated to turn the suction conveying means 51 for conveying a second sensitive material roll S2 in the Y direction.
2. The leading end of the second sensitive material roll S2 is lifted upward by the action of the second feeding roller 10 and is securely held by suction and is advanced to a coned or bent manner predetermined length in the Y direction with the suction belt 51A of the suction conveying means 51.

At the time, pressure rollers 52A of a pressure conveying means 52 are spaced from each other to pass the leading end of the second sensitive material roll S2.

3. The predetermined length of the second sensitive material roll S2 is then cut by the second cutter 4 to a standard size L2 or panoramic size L2' as desired.
4. The standard size sheet L2 or panoramic size sheet L2' which is now a second sensitive sheet S4 is positioned in the lengthwise direction of L2 or L2' by the control action of the suction belt 51A to match the effective exposing area of an exposing stage 6, before being conveyed to the exposing stage 6.
5. After the suction of the suction belt 51A is turned off, the second sensitive sheet S4 is held and transferred by the pressure conveying means 52 to an exposing stage suction conveying means 7.
6. The second sensitive sheet S4 fed to the exposing stage suction conveying means 7 is positioned in the widthwise or B2 direction by the control action of an exposing stage suction belt 7A of the exposing stage suction conveying means 7 to be positioned in the effective exposing area of the exposing stage 6.

When the second sensitive sheet S4 has correctly been positioned in both the lengthwise (L2 or L2) and widthwise (B2) directions and remains held in the effective exposing area of the exposing stage 6, it is exposed to light.

7. The second sensitive sheet S4 after being exposed is conveyed by the exposing stage suction belt 7A in the X direction towards the development station.

As explained, the second embodiment like the first embodiment for exposing a standard or panoramic size of a negative film allows the overall procedure of print development to be performed with optimum efficiency. The pass line of the sensitive material S in this embodiment is minimized in the width due dimension to the second magazine 2 being mounted beneath the pass line, thus contributing to the space saving or dimensional reduction of the photographic processing apparatus.

The processing of a large print size utilizing the maximum of the effective exposing area of the exposing stage 6 in the second embodiment is identical to that of the first embodiment and will not yet more be explained.

Embodiment 3

Figure 4:
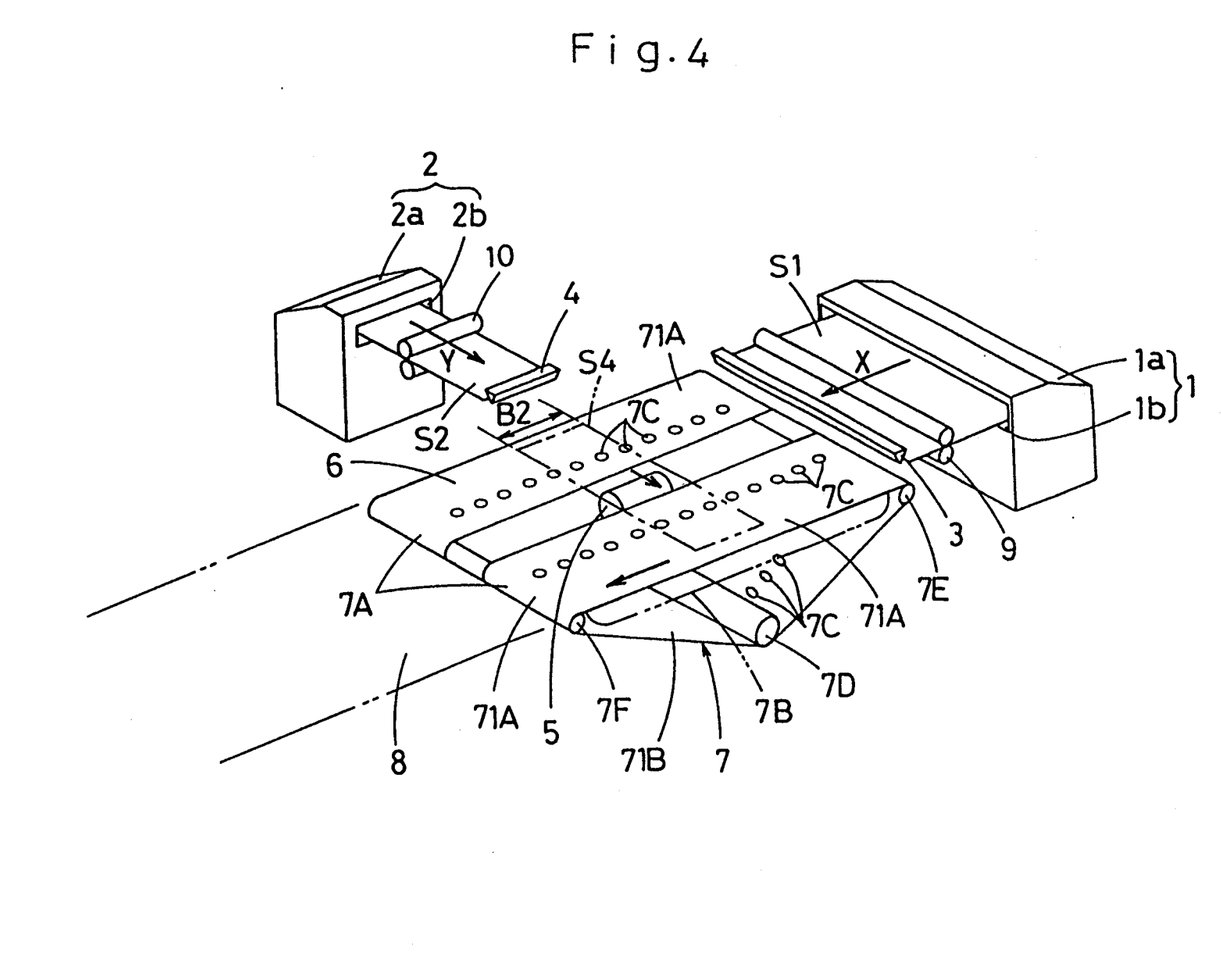
FIG. 4 is a perspective view of a photographic processing apparatus showing a third embodiment of the present invention.

A third embodiment of the present invention will be described referring to FIG. 4.

An exposing stage suction conveying means 7 of this embodiment is disposed at the intersection of the Y direction pass line and the X direction pass line for conveying a sensitive material S in the X direction.

The exposing stage suction conveying means 7 comprises two exposing stage suction belts 7A, which are mounted between three rollers 7D, 7E, and 7F in a triangle configuration and have a multiplicity of apertures 7C in the entire surfaces thereof, and a suction chamber 7B disposed beneath horizontal runs regions 71A, of the two exposing stage suction belts 7A, 7A and provided with a built-in suction fan (not shown). The suction chamber 7B has an air intaking inlet (not shown) provided therein opposite to the back surfaces of the horizontal regions 71A of the suction belts. An exposing stage 6 is arranged above the exposing stage suction conveying means 7.

When air is drawn through the air intaking inlet of the suction chamber 7B and thus the apertures 7C of the suction belts 7A, a first or second sensitive sheet S3,S4 is securely held to the horizontal regions 71A, 71A of their respective suction belts 7A.

A transfer roller 5 (transfer shifting means) is mounted between the two suction belts 7A, of the exposing stage suction conveying means 7 for conveying in the Y direction designated at a right angle to the X or conveying direction of the exposing stage suction belts 7A.

The uppermost surface of the transfer roller 5 is flush with the horizontal regions 71A of the two exposing stage suction belts 7A.

A second magazine 2 is disposed so that when a second sensitive sheet S4 is advanced in the Y direction to the exposing stage 6 above the exposing stage conveying means 7, its width B2 matches the effective exposing area of the exposing stage 6.

Other components are identical in construction and arrangement to those of the first embodiment as denoted by the same numerals and will not be explained in detail.

The exposing operation for making a print from a negative film carrying a random order of standard size frames and panoramic size frames will now be explained referring to FIG. 4.

1. A second sensitive material roll S2 fed from the second magazine 2 to the transfer roller 5 is cut by a second cutter 4 to a standard or panoramic size as desired.
2. The standard or panoramic size frame of a second sensitive sheet S4 is advanced in the Y direction by the transfer roller 5 to be located in the effective exposing area of the exposing stage 6.

At such time, the suction chamber 7B of the exposing stage suction conveying means 7 remains unactuated.

Due to the above mentioned setting of the second magazine 2, the positioning of the second sensitive sheet S4 in the B2 widthwise direction is not needed.

3. When the second sensitive sheet S4 has correctly been positioned in the lengthwise or Y direction by the control action of the transfer roller 5 and remains held in the effective exposing area of the exposing stage 6 by the suction of the exposing stage suction conveying means 7, it is exposed to light.
4. The second sensitive sheet S4 after being exposed is conveyed by with the exposing stage suction belts 7A of the exposing stage conveying means 7 towards the development station for development.

The processing of a large print size utilizing the maximum of the effective exposing area of the exposing stage 6 now will be explained.

1. A first sensitive material roll S1 is fed from a first magazine 1 to the exposing stage suction belts 7A of the exposing stage conveying means 7.
2. The first sensitive material roll S1 being held by suction is advanced to a predetermined length with the exposing stage suction belts 7A and cut by a first cutter 3 to separate a large print size sheet S3.
3. The large print size of the sensitive material sheet S3 is correctly positioned to the effective exposing area of the exposing stage 6 by the action of the exposing stage suction belts 7A.
4. The first sensitive sheet S3 is exposed to light and then is conveyed by with the exposing stage suction belts 7A of the exposing stage conveying means 7 towards the development station.

The third embodiment allows the exposing stage suction conveying means 7 to be located at the intersection of the X and Y direction pass lines and the transfer roller 5 to be disposed between the two suction belts 7A of the exposing stage suction conveying means 7. Accordingly, the second sensitive sheet S4 of a standard or panoramic size can easily be positioned for exposing action by adjustment in the X direction.

Embodiment 4

Figure 5:
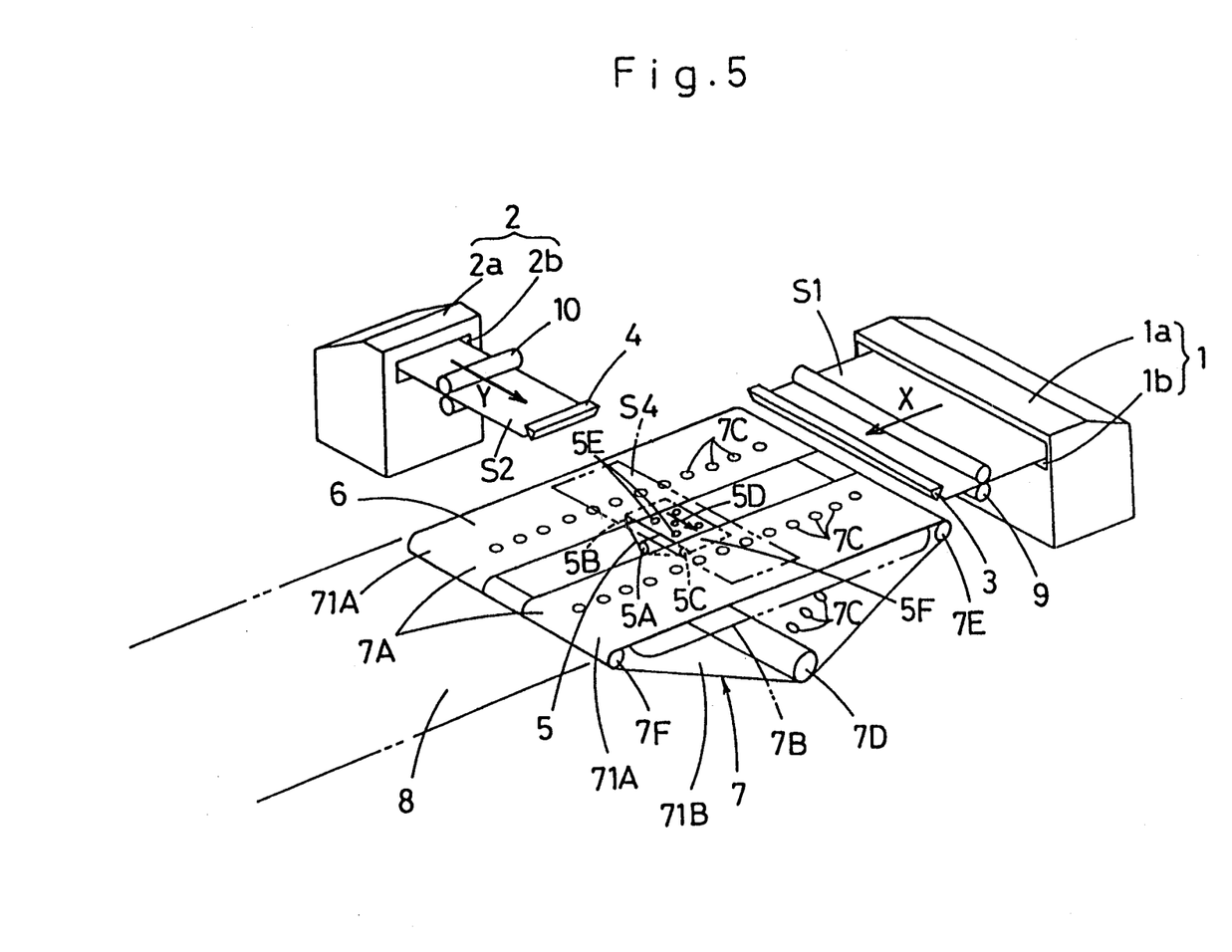
FIG. 5 is a perspective view of a photographic processing apparatus showing a fourth embodiment of the present invention.

A fourth embodiment of the present invention will be described referring to FIG. 5.

An exposing stage suction conveying means 7 of the fourth embodiment is located at the intersection of the Y direction pass line and the X direction pass line for conveying a sensitive material S in the X direction.

The construction of the exposing stage suction conveying means 7 is identical to that of the third embodiment, except that the transfer roller 5 is replaced with another transfer shifting means.

More specifically, the exposing stage suction conveying means 7 comprises two exposing stage suction belts 7A which are mounted between three rollers 7D, 7E, and 7F in a triangle configuration and have a multiplicity of apertures 7C in the entire surfaces thereof, and a suction chamber 7B disposed beneath horizontal runs on regions 71A of the two exposing stage suction belts 7A, and provided with a built-in suction fan (not shown). The suction chamber 7B has an air intaking inlet (not shown) provided therein opposite to the back surfaces of the horizontal regions of the suction belts 7A, 7A. An exposing stage 6 is arranged above the exposing stage suction conveying means 7.

When air is drawn through the air intaking inlet of the suction chamber 7B and thus the apertures 7C of the suction belts 7A a first or second sensitive sheet S3,S4 is securely held to the horizontal regions 71A, of their respective suction belts 7A.

A suction rotary transfer means 5 (the transfer shifting means) is mounted between the two suction belts 7A of the exposing stage suction conveying means 7 for conveying in the Y direction designated at a right angle to the X or conveying direction of the exposing stage suction belts 7A.

The suction rotary transfer means 5 comprises a suction rotary belt 5D having a multiplicity of apertures 5E provided in the entire surface thereof and mounted between three roller 5A, 5B, and 5C in a triangle configuration, and a suction chamber (not shown) mounted beneath a horizontal run or region 5F of the suction rotary belt 5D with its suction opening (not shown) facing the back of the horizontal region 5F so that a second sensitive sheet S4 is securely held by suction to the horizontal regions 5F of the suction rotary belt 5D.

The leading and trailing ends of the horizontal region 5F of the suction rotary belt 5D are situated beneath the horizontal regions 71A of respective exposing stage suction belts 7A.

Other components are identical in construction and arrangement to those of the first embodiment as denoted by the same numerals and will not be explained in detail.

The exposing operation for making a print from a negative film carrying a random order of standard size frames and panoramic size frames will now be explained referring to FIG. 5.

1. A second sensitive material roll S2 fed from a second magazine 2 to the suction rotary transfer means 5 is cut by a second cutter 4 to a standard or panoramic size as desired.
2. The standard or panoramic size frame of a second sensitive sheet S4 is advanced by the suction and transfer action of the suction rotary transfer means 5 until its entire length correctly settles in the effective exposing area of an exposing stage 6.

At such time, the suction chamber 7B of the exposing stage suction conveying means 7 remains unactuated.

3. When the second sensitive sheet S4 has correctly been positioned in the lengthwise direction and remains held in the effective exposing area of the exposing stage 6, it is exposed to light.
4. The second sensitive sheet S4 after being exposed is conveyed by the exposing stage suction belts 7A of the exposing stage conveying means 7 towards the development station for development.

By then, the suction chamber of the suction rotary transfer means 5 has been turned off.

The processing of a large print size utilizing the maximum of the effective exposing area of the exposing stage 6 is identical to that of the third embodiment and will not be explained.

As explained, the fourth embodiment like the third embodiment, allows the second sensitive sheet S4 of a standard or panoramic size to be correctly positioned for exposure by adjustment in the X direction.

What is claimed is:

1. A photographic processing apparatus for separating a desired size sheet from a sensitive material roll, exposing the sheet to light on an exposing stage at an exposure station, and transferring the sheet to a development station, said apparatus comprising:
   a first magazine for feeding a first sensitive material toward the exposure station;
   a second magazine for feeding a second sensitive material in a direction at a right angle to a feeding direction of the first sensitive material;
   a first cutter for separating a first sensitive sheet from the first sensitive material;
   a second cutter for separating a second sensitive sheet from the second sensitive material;
   a conveying pass line for conveying the first and second sensitive sheets separated by respective said first and second cutters to the development station;
   the exposing stage disposed across the pass line; and
   a transfer shifting means mounted at an intersection of the feeding direction of the first sensitive material and the feeding direction of the second sensitive material for transferring the second sensitive sheet to the pass line.

2. A photographic processing apparatus as claimed in claim 1, wherein said exposure station is located at a downstream side of the intersection of said pass line where the second sensitive sheet is loaded, thereby to allow the shifting of the conveying direction of the second sensitive sheet by said transfer shifting means to be executed before exposing at the exposure station.

3. A photographic processing apparatus as claimed in claim 1, wherein the exposure station is located at the intersection of said pass line, thereby to allow the shifting of the conveying direction of the second sensitive sheet by said transfer shifting means to be executed after exposing at the exposure station.

* * * * *